(12) United States Patent
McClintock et al.

(10) Patent No.: US 10,467,423 B1
(45) Date of Patent: Nov. 5, 2019

(54) STATIC ANALYSIS-BASED TRACKING OF DATA IN ACCESS-CONTROLLED SYSTEMS

(71) Applicant: Amazon Technologies, Inc., Reno, NV (US)

(72) Inventors: Jon Arron McClintock, Seattle, WA (US); Tushaar Sethi, Seattle, WA (US); Maarten Van Horenbeeck, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 14/225,958

(22) Filed: Mar. 26, 2014

(51) Int. Cl.
*G06F 16/00* (2019.01)
*G06F 21/62* (2013.01)

(52) U.S. Cl.
CPC .................. *G06F 21/6218* (2013.01)

(58) Field of Classification Search
CPC .................................................. G06F 21/6218
USPC ........................................ 707/781, 783, 786
See application file for complete search history.

(56) References Cited

U.S. PATENT DOCUMENTS

| | | | | |
|---|---|---|---|---|
| 5,941,947 A | * | 8/1999 | Brown | G06F 21/6218 709/225 |
| 6,493,796 B1 | * | 12/2002 | Arnon | G06F 11/2064 709/213 |
| 7,596,672 B1 | * | 9/2009 | Gole | G06F 11/2038 711/160 |
| 7,712,078 B1 | * | 5/2010 | Mirchandani | G06F 8/76 717/111 |
| 7,774,363 B2 | * | 8/2010 | Lim | G06F 21/604 707/781 |
| 7,869,425 B2 | * | 1/2011 | Elliott | H04L 12/14 370/352 |
| 8,099,760 B2 | | 1/2012 | Cohen et al. | |
| 8,131,281 B1 | | 3/2012 | Hildner et al. | |
| 8,307,003 B1 | * | 11/2012 | Sheth | G06F 17/3089 707/790 |
| 8,554,912 B1 | | 10/2013 | Reeves et al. | |
| 8,682,942 B1 | * | 3/2014 | Lee | G06F 17/30979 707/812 |
| 8,995,279 B2 | | 3/2015 | Massoulie et al. | |
| 8,996,482 B1 | * | 3/2015 | Singh | G06F 17/30575 707/698 |
| 9,240,955 B1 | * | 1/2016 | Mukhopadhyay | G06F 17/30094 |

(Continued)

OTHER PUBLICATIONS

Moy, "OSPF Version 2," Request for Comments: 2328, Ascend Communications, Inc, Network Working Group, Category: Standards Track, STD: 54, Obsoletes: 2178, Apr. 1998, 224 pages.

(Continued)

*Primary Examiner* — Hanh B Thai
(74) *Attorney, Agent, or Firm* — Davis Wright Tremaine LLP

(57) ABSTRACT

Method and apparatus for identifying a flow of data from a first data store to a second data store are disclosed. In the method and apparatus, a service may send the data from the first data store to the second data store, whereby the service may be associated with an access control policy that specifies whether the service is permitted to send or receive the data. The access control policy may be used as a basis for the evaluation of executable instructions of the service, and evaluation of the executable instructions may be used to identify the first data store or the second data store.

20 Claims, 7 Drawing Sheets

(56) References Cited

U.S. PATENT DOCUMENTS

| | | | |
|---|---|---|---|
| 9,294,498 B1 | 3/2016 | Yampolskiy et al. | |
| 9,794,130 B2* | 10/2017 | Jenkins | H04L 43/04 |
| 2002/0132667 A1* | 9/2002 | Shoji | A63F 13/10 |
| | | | 463/43 |
| 2003/0041180 A1* | 2/2003 | Schlussman | G06F 8/30 |
| | | | 719/328 |
| 2003/0195987 A1* | 10/2003 | Krishnamurthy | |
| | | | G06F 17/30569 |
| | | | 709/246 |
| 2003/0216935 A1* | 11/2003 | Keppens | G06Q 30/016 |
| | | | 705/304 |
| 2004/0076164 A1 | 4/2004 | Vanderveen et al. | |
| 2004/0122747 A1* | 6/2004 | Jimenez | G06Q 10/0637 |
| | | | 705/26.1 |
| 2005/0076137 A1 | 4/2005 | Tang et al. | |
| 2005/0132220 A1 | 6/2005 | Chang et al. | |
| 2005/0193250 A1 | 9/2005 | Takeuchi et al. | |
| 2006/0021050 A1 | 1/2006 | Cook et al. | |
| 2006/0265751 A1 | 11/2006 | Cosquer et al. | |
| 2007/0276835 A1* | 11/2007 | Murthy | G06F 21/6227 |
| 2008/0019378 A1* | 1/2008 | Hogan | G06F 11/3664 |
| | | | 370/400 |
| 2008/0022270 A1* | 1/2008 | Morrow | G06F 8/38 |
| | | | 717/155 |
| 2008/0028050 A1* | 1/2008 | Fiducci | G06F 17/30194 |
| | | | 709/220 |
| 2008/0071728 A1 | 3/2008 | Lim | |
| 2008/0208369 A1* | 8/2008 | Grgic | G06F 8/60 |
| | | | 700/20 |
| 2008/0208374 A1* | 8/2008 | Grgic | G05B 17/02 |
| | | | 700/83 |
| 2008/0212616 A1* | 9/2008 | Augustine | H04L 67/02 |
| | | | 370/503 |
| 2008/0320089 A1* | 12/2008 | Jung | H04L 12/585 |
| | | | 709/206 |
| 2009/0049220 A1* | 2/2009 | Conti | G06F 13/24 |
| | | | 710/267 |
| 2009/0103442 A1 | 4/2009 | Douville | |
| 2009/0157936 A1* | 6/2009 | Goss | G06F 1/3203 |
| | | | 710/264 |
| 2009/0228983 A1 | 9/2009 | Qin et al. | |
| 2009/0268606 A1* | 10/2009 | DeLew | H04L 41/0663 |
| | | | 370/216 |
| 2010/0124196 A1 | 5/2010 | Bonar et al. | |
| 2010/0128629 A1 | 5/2010 | Sinha et al. | |
| 2010/0128640 A1 | 5/2010 | Okamoto | |
| 2010/0251242 A1* | 9/2010 | Sivasubramanian | |
| | | | G06F 17/30306 |
| | | | 718/100 |
| 2011/0126197 A1* | 5/2011 | Larsen | H04L 9/3213 |
| | | | 718/1 |
| 2011/0131656 A1* | 6/2011 | Haviv | G06F 21/566 |
| | | | 726/25 |
| 2011/0231443 A1* | 9/2011 | Hannel | H04L 63/105 |
| | | | 707/776 |
| 2011/0277027 A1* | 11/2011 | Hayton | H04L 63/0884 |
| | | | 726/8 |
| 2012/0192258 A1* | 7/2012 | Spencer | H04W 12/06 |
| | | | 726/7 |
| 2012/0203738 A1* | 8/2012 | Aigner | G06Q 30/02 |
| | | | 707/634 |
| 2012/0255016 A1* | 10/2012 | Sallam | G06F 21/445 |
| | | | 726/24 |
| 2013/0111559 A1* | 5/2013 | Lomme | G06F 21/6245 |
| | | | 726/4 |
| 2013/0117766 A1 | 5/2013 | Bax et al. | |
| 2013/0132854 A1* | 5/2013 | Raleigh | G06F 3/0482 |
| | | | 715/738 |
| 2013/0151388 A1* | 6/2013 | Falkenborg | G06Q 40/10 |
| | | | 705/35 |
| 2013/0194966 A1* | 8/2013 | Wang | H04L 41/12 |
| | | | 370/254 |
| 2013/0339647 A1* | 12/2013 | Jindo | G06F 3/0617 |
| | | | 711/165 |
| 2014/0046638 A1* | 2/2014 | Peloski | G06F 17/5009 |
| | | | 703/6 |
| 2014/0214610 A1* | 7/2014 | Moshir | G06Q 20/4016 |
| | | | 705/26.35 |
| 2015/0058993 A1 | 2/2015 | Choi et al. | |
| 2015/0133130 A1 | 5/2015 | Gupta et al. | |
| 2015/0163121 A1* | 6/2015 | Mahaffey | G06F 11/0766 |
| | | | 707/687 |
| 2015/0205954 A1 | 7/2015 | Jou et al. | |
| 2018/0041528 A1 | 2/2018 | Machlica et al. | |

OTHER PUBLICATIONS

Moy et al., "Lab Course: Router Lab", Open Shortest Path First (OSPF), Networking Group, RFC 2328, STD 54, Apr. 1998, 20 pages.

* cited by examiner

US 10,467,423 B1

STATIC ANALYSIS-BASED TRACKING OF DATA IN ACCESS-CONTROLLED SYSTEMS

BACKGROUND

In a computing environment, retained data, which may include sensitive or secretive data, may be copied or moved across the environment. For example, the data may be accessed by a computer system and various copies of the data may be stored in locations within the environment or even vended to an external entity. Furthermore, as the size of a computing environment grows, the amount of data that may be categorized as sensitive may also grow. In addition, as the size of a computing environment grows, the number of entities that access the data and retain or exchange the data between one another also grows. If the location in which the data is stored or to which data is provided is not known, the computing environment becomes more exposed to attacks or data theft.

It is often challenging to determine a flow of data within a computing environment by identifying the source of the data as well as a destination receiving the data. Additionally, it is also challenging to utilize access control information when statically analyzing source code for the purpose of identifying data sources and data sinks.

BRIEF DESCRIPTION OF THE DRAWINGS

Various embodiments in accordance with the present disclosure will be described with reference to the drawings, in which.

DETAILED DESCRIPTION

Figure 1:
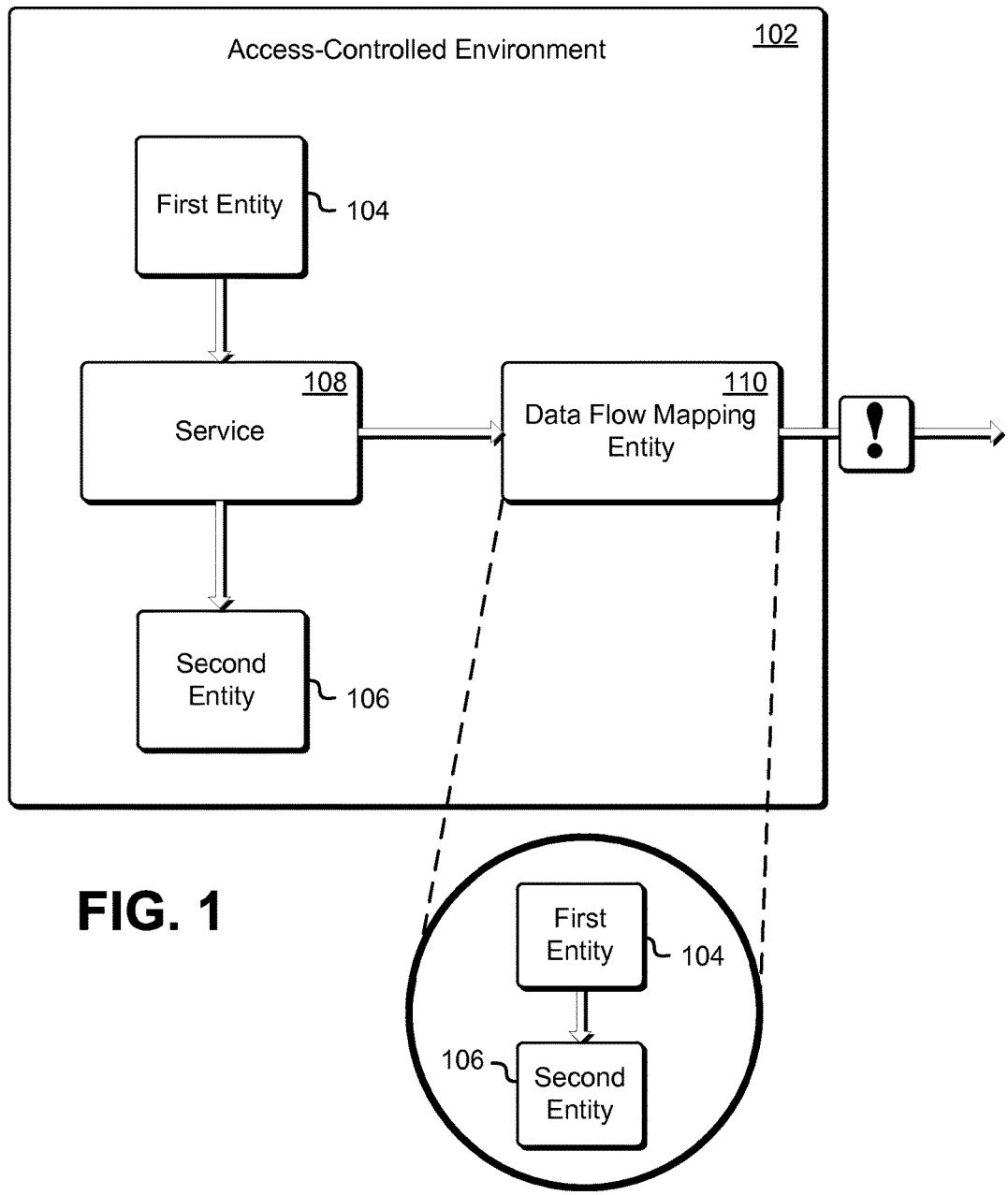
FIG. 1 shows an example of data flow mapping in an access-controlled environment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include evaluating computer system code for a service to determine whether the computer system code, when executed, causes the service to act as an intermediary for a data flow or facilitate the movement or relocation of data from a first data store to a second data store. The computer system code may be executable (for example, when the computer system code is a script). Further, the computer system code may be capable of being compiled into executable instructions that are then executed. The computer system code may also be human readable computer system code, such as a script.

The data may be any type of data, such as bits, bytes or packets of information. Furthermore, the data may be deemed or categorized as secretive, sensitive or critical in a system. The computer system code, in various embodiments, may be source code for a machine or a script code, and the computer system code may be retained in a repository for use. Furthermore, the computer system code may be runtime code or interpreted language including Java, Python or Ruby. As described herein, the service may be a computer system or server, among others, and may utilize distributed computing. The computer system code may cause the service to make one or more service calls that enable retrieving data from the first data store and providing the data for storage in the second data store.

In an access-controlled environment, access controls may dictate actions that a service may affect. For example, the access controls may specify whether the service may receive data from an entity, such as the first data store, or provide data to another entity, such as the second data store. The access controls may be used to inform any static analysis of computer system code. For example, the access control may limit the scope of a search performed on the computer system code as part of the static analysis, whereby the static analysis may be used to determine whether the computer system code cause data to be moved between entities. Further, the static analysis of computer system code may be used to validate that proper access controls are enforced and that computer system code does not violate enforced access controls.

To facilitate static analysis of computer system code one or more identifiers used to reference data may be determined. As described herein, the identifiers may be used by a static analysis entity to track vending of data throughout a system. The static analysis entity may search or parse the computer system code to determine whether the computer system code causes data to be moved between various entities. Further, a simulation environment may be used to determine whether, upon execution, the computer system code causes data to be trafficked, whereby data may be trafficked if the data is provided from one entity to another entity or if the data is exchanged between the entities. The static analysis entity may identify one or more sources of data or one or more sinks for the data based at least in part on the static analysis. In addition, analysis of the computer system code may be performed by parsing logically a logically structured function calls (for example, call trees) and evaluating possible flows through the logically structured function calls.

Upon identification of a data source or a data sink, one or more remedial actions may be taken. For example, if data that is categorized as secretive or sensitive was stored without encryption to an unsecure data source, the data may be deleted. Further, if a violation of enforced access controls is detected, a cause of the violation may be determined and appropriate action may be taken. In various embodiments, data may be tracked within an environment and an entity vending the data as well as an entity receiving the data may be identified. Accordingly, the storage location of any type of data (including data that is categorized as critical or sensitive) may be identified.

FIG. 1 shows an example of data flow mapping in an access-controlled environment in accordance with at least one embodiment. The access-controlled environment 102 includes a first entity 104 and a second entity 106. The first entity 104 or the second entity 106 may be a data store, such as storage service or a database, or any type of computing system, such as a server or a host, among others. The access-controlled environment 102 also includes a service 108 and a data flow mapping entity 110. In the access-controlled environment 102, access to the first entity 104 or the second entity 106 may be subject to an enforced access control policy that specifies a type of request the service 108 may make to the first entity 104 or the second entity 106. The first entity 104 or the second entity 106 may be any entity that is capable of retaining data for retrieval. The service 108 may be a computer system or server, among others, and may be capable of operating in accordance with computer system code as described herein. If permitted by enforced access controls, the service 108 may retrieve data from the first entity 104 and provide the data to the second entity 108.

The data flow mapping entity 110 may be a computer system or an application, among others, that is configured to evaluate computer system code of the service 108 in order to determine whether the service 108 does, in fact, cause data to be moved between the entities 106, 108. The data flow mapping entity 110 may evaluate the computer system code based at least in part on enforced access controls of the access-controlled environment 102. The access controls may be used to confine a scope of evaluation or focus the evaluation on one or more actions that the service 108 permitted to take per the enforced access controls. Based at least in part on evaluating the computer system code, the data flow mapping entity 110 may provide an indication that data is moved from the first entity 104 to the second entity 106.

Figure 2:
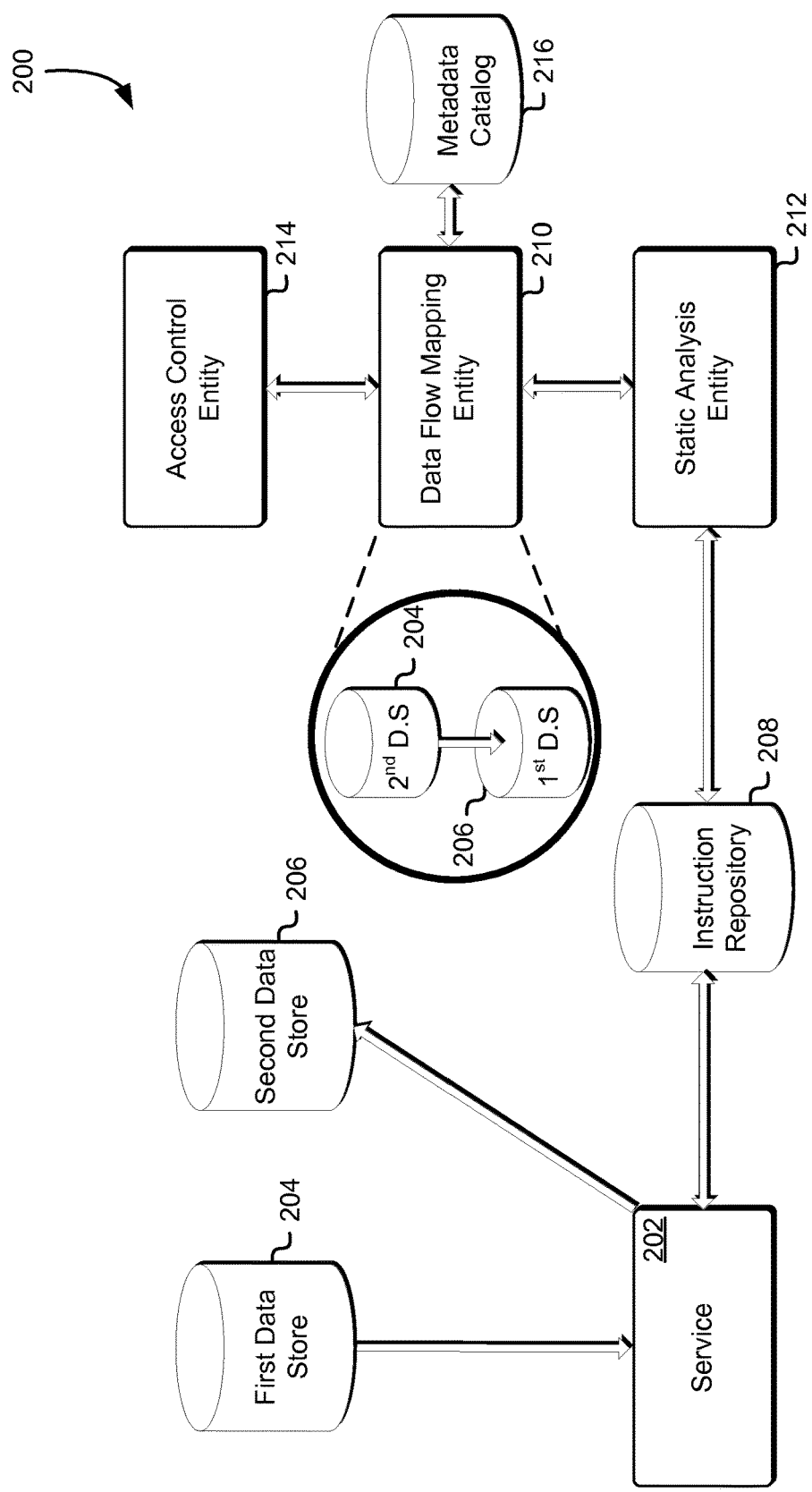
FIG. 2 shows an example of an environment for data flow mapping in accordance with at least one embodiment.

FIG. 2 shows an example of an environment for data flow mapping in accordance with at least one embodiment. In the environment 200, a service 202 accesses data in a first data store 204. The service may be a collection of computing resources and/or other resource collectively configured to access data that is stored by first data store 204. As used herein, unless otherwise stated or clear from context, the collection of computing resources may be a computer system program, process, client, server, service, application, module, operating system entity, controlling domain or combinations of these and/or other such computer system entities. The collection of computing resources may be a client and/or a server and in some embodiments may be configured to send and/or receive communications, data, requests and/or other such requests to and/or from other services within the computer system.

Accessing data may include retrieving the data by, for example, obtaining a copy of the data. Furthermore, accessing the data may include modifying, deleting or altering the data, among others. The service 202 may be associated with an access privilege, whereby the access privilege enables the service 202 access to the first data store 204. The level of access permitted by the access privilege may dictate a type of access granted to the service 202. Furthermore, the level of access may dictate the frequency, among others, by which the service 202 may access the first data store 204. Varying privilege levels may enable various access privileges to services. The service 202 may access the data by submitting a request to the first data store 204. Examples of the request may include an appropriately configured application programming interface (API) function call.

The first data store 204 may be provided by any type of storage service and may be capable or retaining data and providing the data to a requesting party for use. The first data store 204 may also enable a party to submit data to be stored and modify the data as necessary. The first data store 204 may be provided by a database service that is configured to store structured data having a schema or semi-structured data that is schema-less. The database service may cause stored data to be indexed or keyed and made available for retrieval based at least in part on a key or an index associated with the data. Examples of a database provided by a database service include a non-relational database including NoSQL database or a relational database including a SQL database.

The first data store 204 may be provided by a block-level data storage service or an object-level data storage service, among others. A block-level data storage service may utilize block-level storage devices (and/or virtualizations thereof that are provided using underlying physical devices) to provide logical units, such as virtual drives, for use in data storage. The logical units enable persistent storage of data. An object-level data storage service may store data that is organized into objects having arbitrary sizes except, perhaps, for certain constraints on size. Various data objects that are stored by the object-level data storage service may have varying sizes. Any storage service may provide requested data on-demand and with a short retrieval time. Alternatively, a storage service may be an archival storage service that is optimally utilized for storing infrequently accessed data. An archival storage service may be associated with a longer retrieval time than an on-demand storage service.

The environment 200 may belong to an organization, whereby data that is retained by the first data store 204 may belong to an organization and may be stored for use the service 202, among other services of the organization. Further, the organization may be a set of principals organized in some manner. At least a portion of the data may be deemed to be sensitive or critical to the operation of the organization. For example, the data may include trade secrets, confidential information or customer information. Accordingly, it may be undesirable for the data to be obtained or accessed in a malicious manner. Further, if the data is accessed, copied, moved or relocated in any manner, it may be desirable for the organization to ascertain a location of the data in order to potentially take one or more corrective actions. For example, if organization is electronic commerce provider and the first data store 204 is designated as a central storage authority of customer address information, it may be desirable to track any retrieval and subsequent storage a customer's address within the organization. By identifying a destination of where the customer's address was stored following retrieval, corrective action including deleting the customer's address from the new storage location may be taken.

As shown in FIG. 2, the service 202 has an associated instruction repository 208. The instruction repository 208 may have memory resources that are configured to store instructions for use by the service 202. Although one service 202 is shown in FIG. 2 it may be contemplated that in various embodiments, a plurality of service may be used, whereby each service of the plurality of services may access data retained by a storage system, such as the first data store 204. In addition, each service of the plurality of services may utilize instructions that are retained by the instruction repository 208. The instruction repository 208 may be a distributed revision control and source management system. The instruction repository 208 may permit a plurality of parties to collaborate on updating or maintaining the instructions. A central instruction repository 208 is advantageous in an enterprise due to the fact members of an organization may easily collaborate on constructing instruction routines for execution.

The instruction repository 208 may retain one or more files that include instructions for execution by the service 202. The instruction repository 208 may be equipped with revision control functionality whereby the instruction repository 208 may permit keeping track of various versions of the instructions. Executable routines may be stored in the instruction repository 208 for execution by the service 202. The service 202 may have a mirrored copy of the instructions, whereby the instruction repository 208 may retain a central copy. It is noted that the instructions may include application programming interface (API) function calls or routines, among others, that the service 202 may be configured to make. The instructions may be computer system code that may be executable (for example, when the computer system code is a script). Further, the computer system code may be capable of being compiled into executable instructions that are then executed.

As described herein, the instructions may include addressing information, such as a uniform resource identifier (URI), or a remote procedure call object (RPC) that causes the execution of a procedure in another address space or computing system. Such information may be used to identify an entity with which the service 202 interacts. Furthermore, other identifying information, such as an application programming interface (API), library may be used to identify the nature of the interaction between the service 202 and another entity. Instructions maintained by the instruction repository 208 may include source code that specifies service calls to be made the service 202.

The service 202 receives relevant instructions from the instruction repository 208. The instructions may dictate operation of the service 202 and the service 202 makes one or more service calls based at least in part on the instructions. The instructions may specify that the service 202 make a service call to the first data store to retrieve a portion of data and store the data portion a second data store 206. The second data store 206 may be provided by any type of storage service and may be capable of retaining data for use. The second data store 206 may be provided by a database service that is configured to store structured data having a schema or semi-structured data that is schema-less. The database service may cause stored data to be indexed or keyed and made available for retrieval based at least in part on a key or an index associated with the data. Examples of a database provided by a database service include a non-relational database including NoSQL database or a relational database including a SQL database. As described herein, the second data store 206 may be provided by a block-level data storage service or an object-level data storage service, among others.

The instructions may specify that the service 202 store the data in a local storage associated with the service 202, such as a local hardware disk drive. The service 202 may also transmit or vend the portion of data to an entity outside the organization. The data may be transformed, for example, by encrypting the data using an encryption algorithm. Alternatively, the data may be vended to another party (for example, by being transmitted to the other party) or consumed as-is without modification or may be modified. Sending the data to another party may be intentional, whereby, for example, the instructions retrieved from the instruction repository 208 dictate that the data is to be sent to the other party. Alternatively, a malware present on the service 202 may output data unbeknownst to a party monitoring the instruction repository 208.

In various embodiments, it is desirable for an organization to identify flows of data within the organization. Further, it is also desirable to identify the party providing the portion of data (also referred to herein as the source) and the party receiving the portion of data (also referred to herein as the sink). For example, it may be desirable to identify that the portion of data retrieved from the first data store 204 has been stored in the second data store 206. Further, it may be desirable to classify identified data flows by type of data being trafficked and whether the data is untransformed or "raw" or whether the data has been transformed. Transformation of data (by for example encrypting the data) may make it very difficult for a party having access to the transformed to make use of the data absent the party having a decryption key.

A data flow mapping entity 210 is provided. The data flow mapping entity 210 may be a collection of computing resources and/or other resource collectively configured to identify a flow of data within the environment 200. As used herein, unless otherwise stated or clear from context, the collection of computing resources may be a computer system program, process, client, server, service, application, module, operating system entity, controlling domain or combinations of these and/or other such computer system entities. The collection of computing resources may be a client and/or a server and in some embodiments may be configured to send and/or receive communications, data, requests and/or other such requests to and/or from other services within the computer system.

The data flow mapping entity 210 may identify one or more entities within the environment which act as providers or recipients of data. The entities may include the first data store 204, the second data store 206 or the service 202. Furthermore, the data flow mapping entity 210 may also identify the type of data being trafficked. In various embodiments, the data may be classified in accordance with attributes associated with the data. Data may be deemed as secretive, sensitive or critical if, for example, the risk of the data being obtained by an unauthorized party would be detrimental to the organization. Other types of data may not be deemed as secretive, sensitive or critical. However, it may be desirable to identify sources or sinks that traffic the data in order to identify or expose one or more vulnerabilities within the environment 200, whereby the vulnerability may be used to output critical data.

The data flow mapping entity 210 may utilize services or resources provided by a static analysis entity 212 and an access control entity 214 to identify a data flow. The static analysis entity 212 may be a collection of computing resources and/or other resource collectively configured to analyze instructions retained by the instruction repository 208 and identify one or more sources or sinks of data within the environment 200. As used herein, unless otherwise stated or clear from context, the collection of computing resources may be a computer system program, process, client, server, service, application, module, operating system entity, controlling domain or combinations of these and/or other such computer system entities. The collection of computing resources may be a client and/or a server and in some embodiments may be configured to send and/or receive communications, data, requests and/or other such requests to and/or from other services within the computer system. The static analysis entity 212 may utilize a custom static analysis tool to identify vulnerabilities in instructions, among other purposes. A static analysis tool may be environment-specific or may be commercially available. In addition to identifying vulnerabilities in instruction that may expose the environment to attacks or malware, a static analysis tool may identify the flow of data within an environment 200. Examples of the vulnerabilities include a code injection vulnerability that exposes the environment to a cross-site scripting attack by facilitating for an attacker to inject malicious code.

The static analysis entity 212 may access instructions retained by the instruction repository 208 and trace an execution path of the instructions to identify a source and destination of data. As described herein, the instructions may be computer system code that may be executable (for example, when the computer system code is a script). Further, the computer system code may be capable of being compiled into executable instructions that are then executed. For example, instructions retained by the instruction repository 208 may specify that the service 202 make an API configured service call to the first data store 204 to obtain certain data. Another instruction may specify that the service 202 cause the retrieved data to be stored in the second data store 206. The static analysis entity 212 may parse instructions that are evaluated by the service 202 in order to trace the flow of data from a source to a destination.

The data flow mapping entity 210 may configure the static analysis entity 212 with parameters associated with the type of service calls specified by the instructions that are sought to be tracked. In addition, the data flow mapping entity 210 may configure the static analysis entity 212 with parameters associated with the data whose flows are sought to be identified. Accordingly, the data flow mapping entity 210 may cause the static analysis entity 212 to be focused on particular flows of interest or a particular classification or type of data being trafficked between entities or vended to entities. Further, the data flow mapping entity 210 may cause the static analysis entity 212 to identify data flows between entities of interest, such as a source data store and a destination data store. If the first data store 204 retains various databases of data, the data flow mapping entity 210 may be configured to identify a sink associated with one type of data or one category of data being copied or moved from the first data store 204. For example, if the organization pertains to a content provider that retains customer addresses and billing information, the data flow mapping entity 210 may be configured to identify the source all sources of a customer address or billing information and all sinks receiving the customer address or billing information.

As described herein, the data flow mapping entity 210 may be provided with one or more identities (for example, variable names) associated with data or a category thereof. The one or more identities may correspond to a known or expected reference to the data category used in the instructions of the instruction repository 208. For example, it may be known that customer address information is referenced by '$address', '$addr' or '$a' in instructions retained by the instruction repository 208. Accordingly, if the movement of customer address information is sought to be tracked, the reference information may be provided to the data flow mapping entity 210. The data flow mapping entity 210 may, in turn, search for the reference information within the instruction repository 208 and trace the movement of data within one or more flows or execution routines specified by the instructions of the instruction repository 208.

In addition to the reference information, the data flow mapping entity 210 may be provided with identifying information associated with service calls of interest. The service calls may be any type of functions that dictates the movement or manipulation of data. Examples of a service call include an application programming interface (API) configured function call, among others. The data flow mapping entity 210 may be instructed to confine source/sink identification to data flows associated with execution routines that include the specified service call or are affected by the specified service call. In addition to identifying a source or sink for the data, the data flow mapping entity 210 may also identify the service 202 as facilitating the data exchange. In various embodiments, some service calls made by the service 202 do not result in any movement of data, and, accordingly, execution routines that are entirely comprised of such service calls may not necessarily be required to be traced in order to identify whether data was moved from a source to a sink.

The data flow mapping entity 210 is equipped with a metadata catalog 216. The metadata catalog 210 may be used to store reference information for data categories, such as variable names. In various embodiments, the reference information may indicate sensitive or critical data that is sought to be tracked. In addition, the metadata catalog 210 also retains identifying information for service calls that may be made by entities within the environment 200. Further, a Web Services Description Language (WSDL) file that retains a description of service calls and their associated parameters may be used to inform the static analysis entity 212 of functions that are expected to be called. The WSDL file may further specify parameters for a function call and a data structure associated with the return of the function call. A search of the instruction repository 208 for data sources or sinks may be based at least in part on parsing one or more WSDL files. The metadata catalog 216 may be updated in accordance with changes in the environment. If a data category that is sought to be tracked acquires a new reference name (for example, due referencing the data by the new name in an instruction), the metadata catalog 216 may be updated to incorporate the new reference name. The new reference name may be used by the static analysis entity 212 for tracking the data.

The metadata catalog 216 may be used to identify a set of potential data sources that may vend a data portion, whereby the data portion may be categorized as critical or secretive. The metadata catalog 216 may also be used to identify a set of potential destinations that may receive the data portion vended by the any member of the set of data sources. The metadata catalog 216 may specify an application programming interface (API) library for an entity, whereby the API library may indicate that the entity is capable of utilizing the API library to make one or more service calls that cause data to be vended from a member of the set of data sources or that cause data to be provided to a member of the set of destinations. Accordingly, information retained by the metadata catalog 216 may be used to identify a potential source, destination or intermediary entity that facilitates a data flow between the source and the destination. An analysis of the source code of an entity for data flow identification may be dependent upon the capabilities associated with the entity or the type of data retained by the entity. For example, certain entities may not be of interest as data sources because they do not retain data that is categorized as secretive or sensitive. Further, other entities may not be of interest as intermediary entities because the entities do not facilitate a flow of data (for example, due to the fact they are not configured to retrieve data or vend data).

The data flow mapping entity 210 also receives access control information from an access control entity 214. The access control entity 214 may retain information indicating an access privilege given to the service 202, among other entities in the environment 200. The access privilege may specify the types of operations or functions that the service 202 may perform. Varying levels of access privileges may correspond to varying permissions given the service 202.

The access privilege may be governed by an enforced access control policy. The access control entity 214 may also be responsible for enforcing the access control policy and ensuring that the service 202 may only access entities, such as the first data store 204 and the second data store 206, if such access is permitted by the access control policy in accordance with the access privilege of the service 202. It may be recognized that the service 202 may not exercise the full extent of its access privilege, and, accordingly, an access privilege of the service 202 may not be used as an accurate indication of data flow in the environment 200. For example, the service 202 may be permitted (according to the service's 202 access privilege) to read data from the first data store 204 and write data to the second data store 206. However, the existence of this access privilege may not necessarily indicate that data has been moved from the first data store 204 to the second data store 206 due to the fact that the service 202 may not have instructed by an instruction retained in the instruction repository 208 to read or write the data.

The access privilege information retained by the access control entity 214 may be used to further focus the parameters of the static analysis performed by the static analysis entity 212. For example, if the service 202 is not permitted to read or write data to an entity within the environment, the static analysis entity 212 may be configured not to trace execution routines associated with the service 202.

Figure 3:
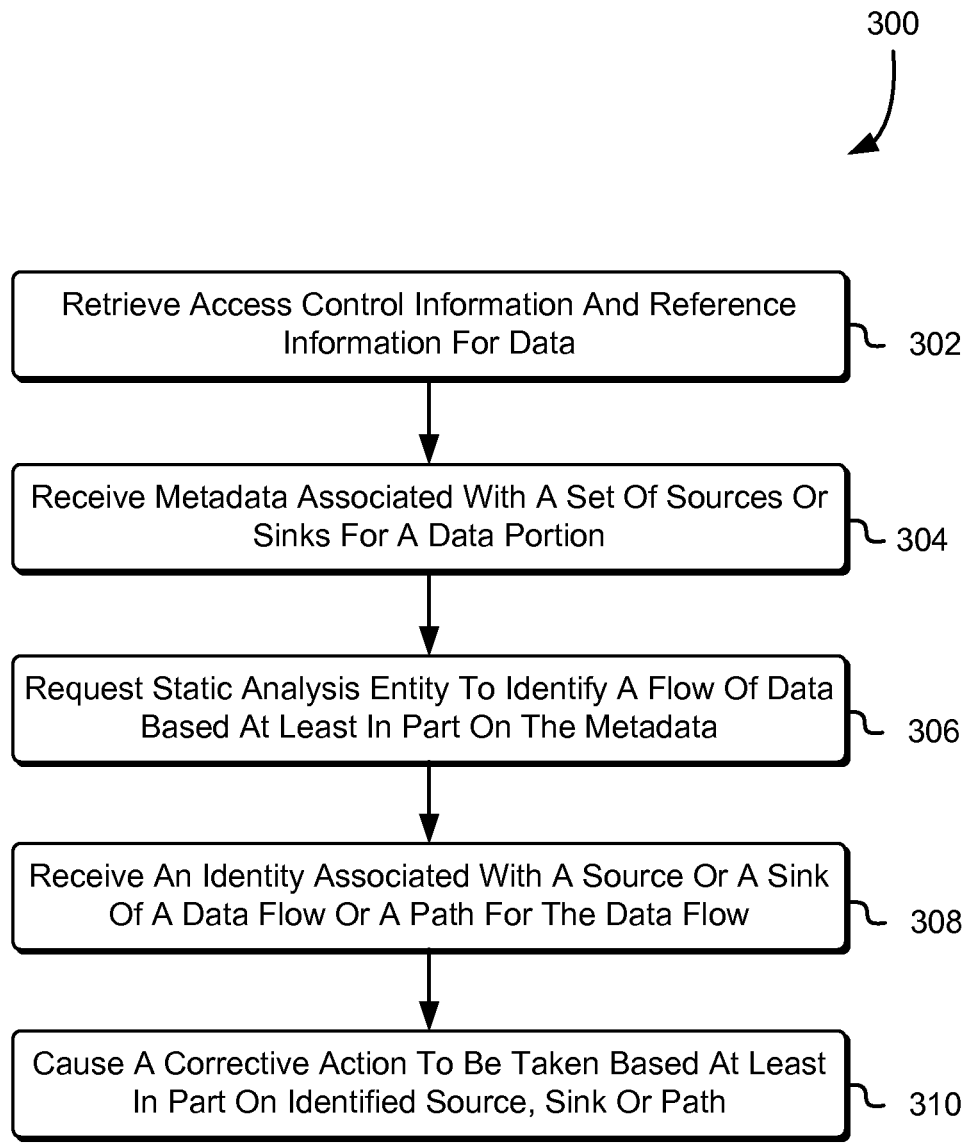
FIG. 3 shows an example of a method for identifying a source or sink for one or more data flows in accordance with at least one embodiment.

FIG. 3 shows an example of a method for identifying a source or sink for one or more data flows in accordance with at least one embodiment. In the process 300, a data flow mapping entity, such as the data flow mapping entity described with reference to numeral 210 in FIG. 2, retrieves access control information and reference information for data. As described herein, the access control information may be retrieved from an access control entity and may specify a privilege level for an entity. The privilege level may be indicative of one or more permissions associated with the entity and may be used to determine the types of actions the entity, which may be a service in various embodiments, may take. The reference information for the data may specify one or more identifiers associated with data, whereby the data may be sensitive data whose destination is sought to be identified. The reference information may be a nomenclature associated with the data including but not limited to variable names or code names used to refer to the data in instructions (for example, source code) that are executed within a system. Because various instructions may be written by different parties and may refer to the same data differently, the reference information for the data maybe identified by analyzing instructions of the system and identifying various variable names used to refer to the data. In addition, the reference information may also include identification of function calls or service call that may be used in routine that moves, copies or duplicates the data.

The data flow mapping entity also receives 304 metadata associated with a set of sources or sinks for the data portion. As described herein, the data portion may be sensitive or secretive. Further, the set of sources or sinks may be entities of interest, whereby a data flow between a source of the set of sources or a sink of the set of sinks may be sought to be identified. The set of sources and the set of sinks may be overlapping and may not necessarily be mutually exclusive. The metadata may be used to identify a data flow of the data portion between a source and a sink. For example, a service call may be identified that retrieves data from a source of the set of sources. Additionally, another service call may be identifies as causing data to be provided to a sink of the set of sinks.

The data flow mapping entity then requests 306 the static analysis entity to identify a flow of data based at least in part on the metadata. The metadata may be used to identify function calls between the set of sources and the set of sinks and determine whether the function calls, in their totality or upon their execution, cause data to be retrieved from a source and provided to a sink. Further, access control information may be used to exclude certain entities from potentially being identified as a data source or sink, for example, due at least in part to the entities lacking a permission to send or receive data or act as an intermediary entity or gateway for a data flow. Furthermore, the access control information may be used to target one or more entities and determine whether the entities vend or receive data or to focus a search performed by the static analysis entity on one or more services that exchange data. The static analysis entity may be equipped with search functionality that permits it to search for and identify portions of a source code of a system that are used to exchange the pertinent data. The static analysis entity may also evaluate the code in order to determine whether the source code, when executed, causes the data to be moved, and if so, the source or destination of the data. Evaluating the source code may include, among others, tracing the execution steps of the code and determining based at least in part on the traced execution steps whether data is moved.

In response to the request, the data flow mapping entity receives 308, from the static analysis entity, an identity associated with a source or sink for a data flow or a path for the data flow. The data flow may traverse one or more services between the source and the sink and the one or more services may be identified as part of the data flow, whereby service calls made by the one or more services may cause data to be retrieved from the source and provided to the sink. As described herein, the static analysis entity may parse a call tree and evaluate possible flows through the call tree to determine whether the data portion of interest is trafficked between the source and the sink. The data flow mapping entity causes 310 one or more corrective actions to be taken based at least on the identified source, sink or path. The corrective actions may include deleting the data from the sink or notifying an administrator that sensitive data is vended to an unauthorized party. Furthermore, the one or more corrective actions may include notifying a provider of source code that the source code violates organization policies or that a potentially unintended consequence of source code execution results in data categorized as sensitive being provided to an unauthorized entity.

Figure 4:
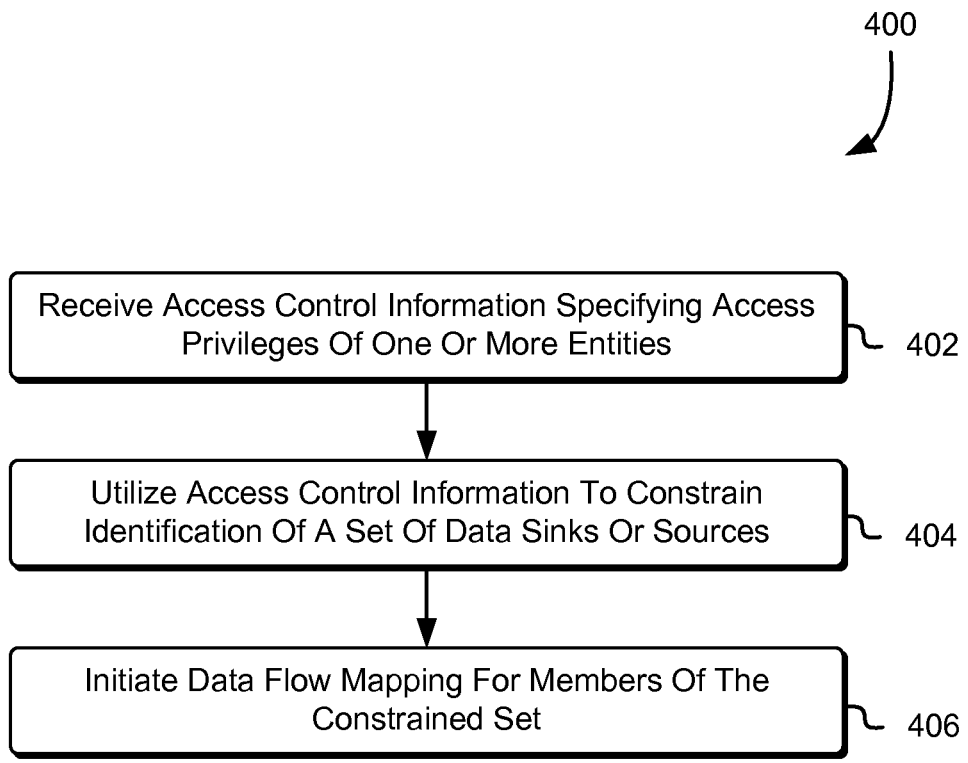
FIG. 4 shows an example of a method for identifying a source or a sink for a data flow in accordance with at least one embodiment.

FIG. 4 shows an example of a method for identifying a source or a sink for a data flow in accordance with at least one embodiment. In the process 400, a data flow mapping entity, such as the data flow mapping entity described with reference to numeral 210 in FIG. 2, receives access control information specifying privileges of one or more entities. The access privileges may specify whether the one or more entities are authorized to make a service call to one or more other entities, whereby a service call may result in data being exchanged between at least one entity of the one or more entities and at least another entity of the one or more other entities. The service call may specify data variables to be returned and execution of the service call may result in data being received by the at least one entity. The data flow mapping entity utilizes 404 the access control information to constrain the identification of a set of data sinks or data sources.

For example, if an entity, such as a service, is not permitted to receive data from a data store or provide data to another entity, the service may be excluded from the process of identifying data sources and sinks. The exclusion may be based at least in part on an assumption that an access control policy is enforced in a system and that service calls made by the entity are made subject to the access control policy, whereby a service call that is not in accordance with the access control policy may be denied or actions specified by the service call may not be permitted to be taken. Accordingly, a scope of identification of data sources or sinks may be confined to actions that are permissible. For example, an analysis of source code may not be exhaustive and may instead be focused on actions that are permissible by an enforced access control policy or on entities that may exchange data in accordance with the enforced access control policy.

The data flow mapping entity then initiates 406 data flow mapping for members of a constrained set of data sinks or data sources. Constraining the data sources or data sink may also be based at least in part on a type of an action associated with an entity or a property associated with the entity. For example a service may not be of interest as a data source because the service is not permitted to provide data to another service, however, the service may be of interest as a data sink because the service is permitted to receive data and has a local storage space to which it is permitted to write data. Data flow mapping may be used to identify data sources and data sinks based at least in part on static analysis, whereby the scope of the analysis may be limited or confined using access control information.

In alternative embodiments, instructions, such as source code, may be analyzed to determine access control policy violations. Accordingly, an entity that may be deemed as benign (for example, due to the fact that an access control policy prohibits the entity from exchanging data) may still be targeted for static analysis in order to determine whether a violation of enforced access control is taking place (for example, due to the fact the entity exchanges data in violation of enforced access controls).

Figure 5:
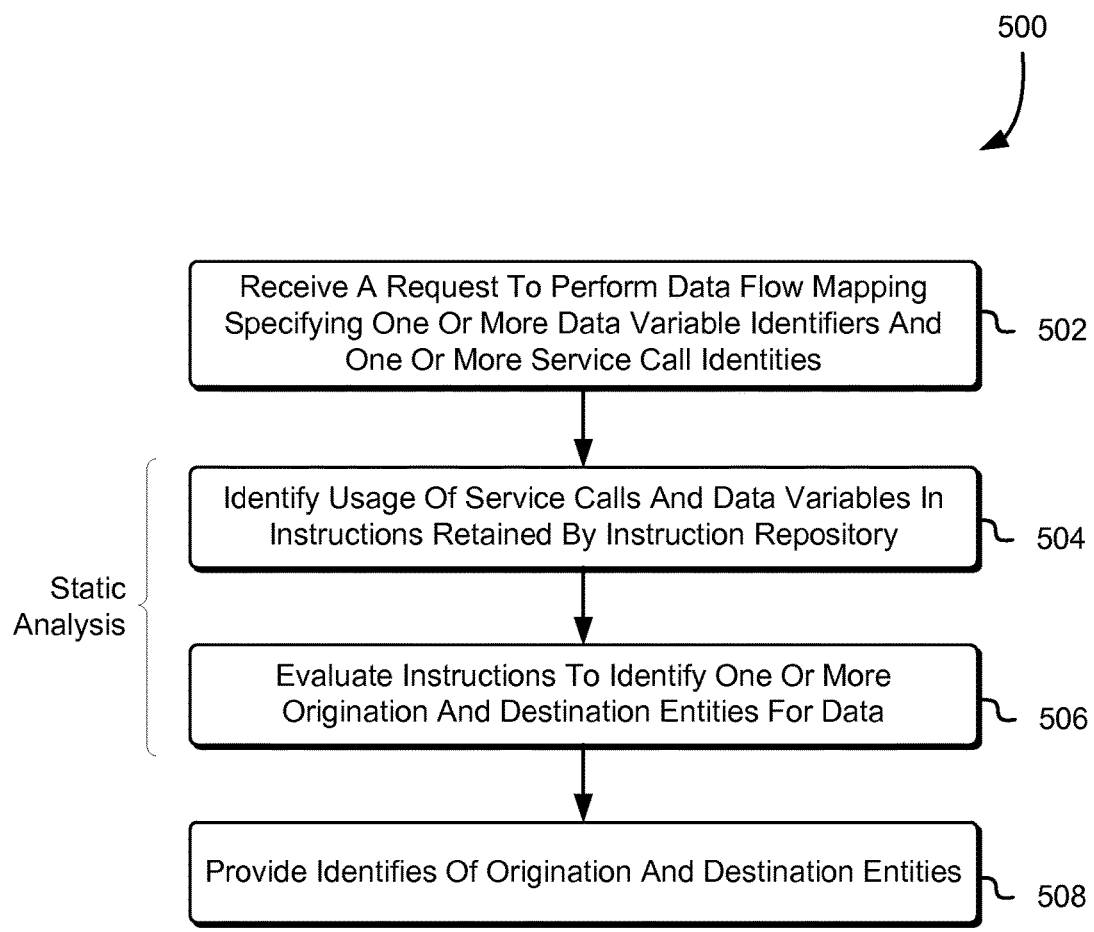
FIG. 5 shows an example of a method for performing data flow mapping in accordance with at least one embodiment.

FIG. 5 shows an example of a method for performing data flow mapping in accordance with at least one embodiment. In the process 500, an entity, such as the static analysis entity described with reference to numeral 212 in FIG. 2, receives 502 a request to perform data flow mapping, whereby the request specifies one or more data variable identifiers and one or more service call identities. The data variable identifiers may specify names of data that is sought to be tracked. For example, the identifiers may be names that are known to be given to the data by developers or system designers, among others. The instructions retained by the instruction repository may refer to the data using the identifiers. The one or more service call identities may identify service calls that are expected to use the identifier, for example, as arguments or returns. Further, the service calls may be executed to cause data to be trafficked between system entities.

The static analysis entity then identifies 504 usage of the service calls and data variables in instructions retained by the instruction repository. For example, the static analysis entity may parse the instructions to identify incidents of use of the service calls or data variables. The static analysis entity then evaluates 506 the instructions to identify one or more origination and destination entities for data. As described herein, the data may be identified by the one or more variables. In addition, the static analysis entity may evaluate the instructions by, for example, simulating instruction execution in order to determine whether the instructions cause movement of data between entities. The static analysis entity may trace various execution routines in order to determine whether execution routines result in data movement between a source and a destination. The static analysis entity then provides 508 the identities of the origination and destination entities for use. As described herein, a mapping for data flows may be constructed based at least in part on the provided identities.

Figure 6:
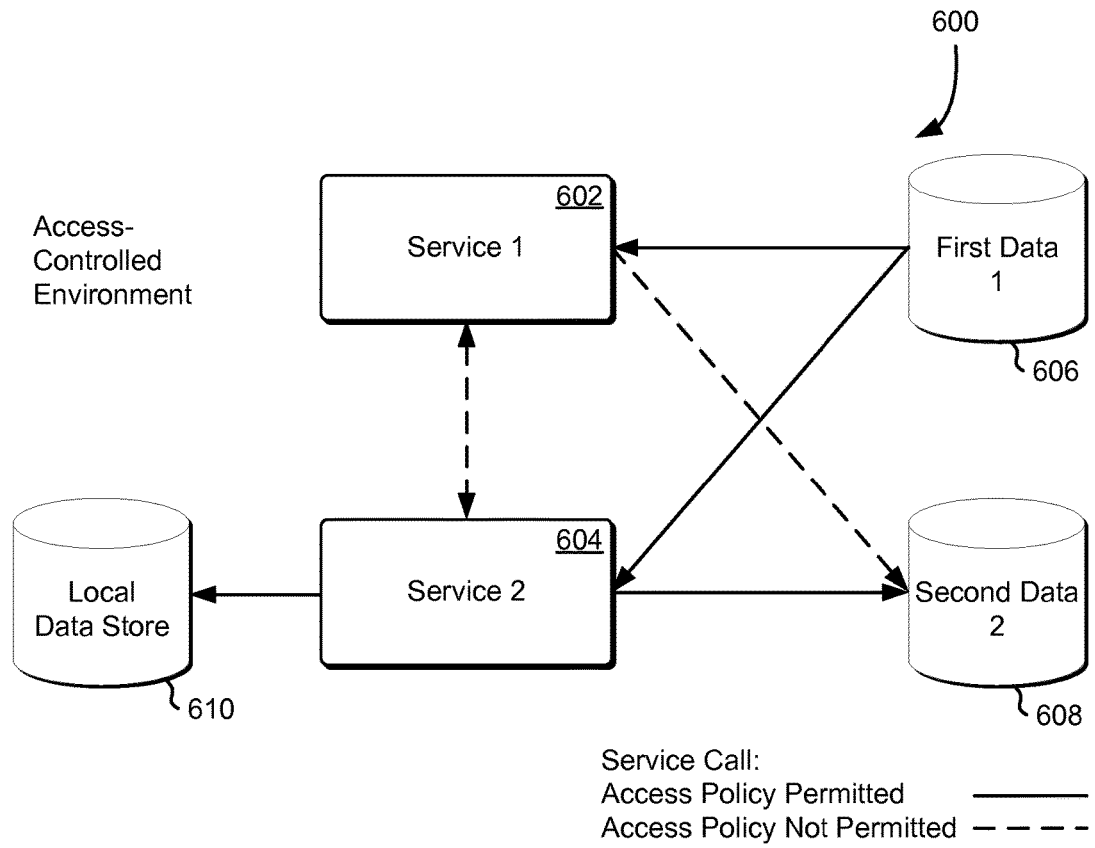
FIG. 6 shows an example of an access-controlled environment in accordance with at least one embodiment.

FIG. 6 shows an example of an access-controlled environment in accordance with at least one embodiment. A first service 602 and second service 604 are shown in the environment 600 as well as a first data store 606, a second data store 608 and a local data store 610. Examples of the first service 602 or the second service 604 include the service 202 described with reference to FIG. 2. In addition, examples of the first data store 606 or the second data store 608 include the first data store 204 and the second data store 206 also described with reference to FIG. 2. The local data store 610 may be any type of memory device utilized by the second service 604 including but not limited to hard disk or a solid state drive. Data access within the environment may be controlled by an access control entity (not shown), whereby the access control entity may enforce a system-wide access control policy. The access control policy may specify for entities within the environment 600 actions that may be taken by an entity including a type or category of service calls that are permissible for the entity.

As shown in FIG. 6, the first service 602 may retrieve data from the first data store 606 but may not provide the data to the second service 604 or cause the data to be stored in the second data store 608. Furthermore, the second service 604 may retrieve data from the first data store 606 and may provide the data to the second service 604 and cause the data to be stored in the local data store 610 of the second service 604. Accordingly, per the access control policy, the first data store 606 may serve as a source and the second data store 608 or the local data store 610 may serve as sinks for data trafficked by the second service 604. The first service 602, on the other hand, may not facilitate the exchange of data between a source and a sink.

Access control information that may be gleaned from the access control policy may be used to limit any evaluation, search or static analysis performed on an instruction repository to certain scenarios of data exchanges or certain data flows. For example, only data flows that are permissible may be sought to be examined to determine whether data is exchanged between a source and a sink. Conversely, however, violations of access control policy may be identified if access control policy is not used to inform instruction evaluation and if, instead, identified data flows are used to determine whether an access control policy has been circumvented as described herein.

In an embodiment, an enforced policy may specify restrictions associated with storing data or certain types of data to a data store. For example, the enforced policy may specify that data having a particular category may not be stored unencrypted. In this instance, data flow mapping may be performed to identify the storage location of data and whether the storage satisfies the enforced restriction specifying that the data be stored in an encrypted form. Accordingly, data flow mapping may be used to identify a violation of a policy.

In various embodiments, source code searching or analysis may be used to determine one or more identifiers used to reference data. For example, the source code may be searched to determine an identifier used to reference a portion or type of data, such as a customer address. The one or more identifiers may be compiled in a catalog and used when evaluating source code for data flow analysis. If all identifiers that are used to reference data are determined, a comprehensive evaluation of source code may be performed based at least in part on the identifiers. In another embodiment, prior to instructions being checked in to an instruction repository, such as a Git distributed instruction repository, the party checking the code may be requested to declare variable identifiers used to reference data types. The declared information may be used to construct the catalog of data identifiers.

In at least one embodiment, dynamic service call tracing may be used to identify one or more services that handle (for example, by sending or receiving) various types of data, such as data having a particular pattern or value or data that belongs to a category of data including sensitive or secretive data. Data flow mapping as described herein may be used to bridge dynamic service call tracing. For example, if dynamic tracing indicates that a first service is handling data of interest, data flow mapping as described herein may be used to determine whether the data was sent to a second service, whereby the second service may not support dynamic call tracing but may be subject to static analysis-based data flow mapping. Accordingly, data flow mapping may be used to augment dynamic tracing in any part of a system. Various hops in a data flow may be identified and bridged by either dynamic tracing or data flow mapping.

In an embodiment, Linux-based STrace or Unix-based PTrace may be used to monitor systems calls of a program executing on a service at the kernel level. Monitoring system calls may indicate one or more parties the service is connected to or with which the service exchanges data. Furthermore, indications as to whether data is written to a local disk may be provided. The monitoring of system calls may be used to augment data flow mapping as described herein. In addition, data flow mapping may be prioritized or fine-tuned based at least in part on Strace or PTrace information. For example, information gleaned from Strace or PTrace may be used to indicate that data received by a service is vended through an output point or socket.

In at least one embodiment, source code annotation language (SAL) or another annotation standard may be used to annotate source code. Evaluation of source code may utilize annotation to determine a source or destination associated with data. In addition, the annotation may be used to determine whether data has been mutated or transformed. For example, code annotation may indicate that data of interest was encrypted or sanitized.

Figure 7:
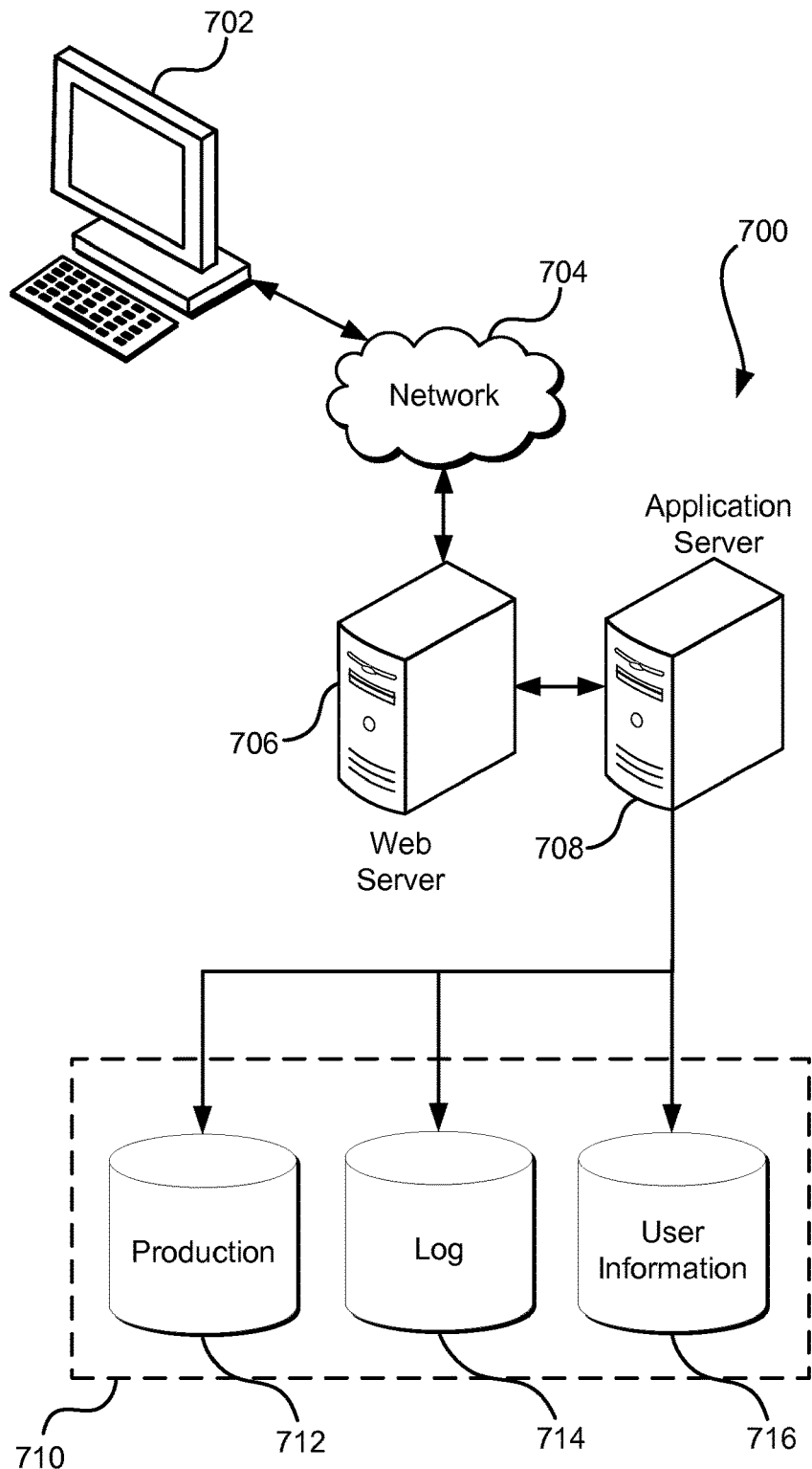
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving source code including at least a set of service calls associated with a first set of data stores and a second set of data stores; and
identifying data based at least in part on one or more data variable identifiers of the data to perform static analysis mapping of data flow to generate a data flow map, the data flow map indicating movement of data among the first set of data stores and the second set of data stores, the performance of the static analysis comprising:
obtaining an access control policy that specifies enforcement of an access restriction of a service that causes the exchange of data between a subset of the first set of data stores and a subset of the second set of data stores;
evaluating the source code, based at least in part on the access control policy and one or more data variable identifiers of a data portion, to determine whether the access control policy is violated, wherein evaluating the source code includes parsing service calls made by the source code indicating movement of the data portion from one data store location to another;
updating, based on the evaluation, the data flow map to indicate that the data portion is provided from the first data store of the first set of data stores to the second data store of the second set of data stores; and
using the updated data flow map to identify the location of the data portion and determine whether the data portion was provided from the first data store to the second data store correctly.

2. The computer-implemented method of claim 1, further comprising performing one or more corrective actions based at least in part on identifying the first data store of the first set of data stores or the second data store of the second set of data stores.

3. The computer-implemented method of claim 2, wherein the one or more corrective actions include deleting the data portion from the second data store of the second set of data stores or providing, to a device associated with an administrator, an indication that the data portion is stored in the second data store of the second set of data stores.

4. The computer-implemented method of claim 1, wherein evaluating the source code further includes:
identifying incidences of occurrence of the one or more data variable identifiers associated with the data portion in the source code; and
simulating execution of the source code in a simulation environment to identify whether the source code causes the data portion to be sent from the first data store of the first set of data stores to the second data store of the second set of data stores.

5. A system comprising:
memory to store instructions that, as a result of being executed by one or more processors of the system, cause the system to:
for a computing system having a set of access privileges that specifies enforcement of an access restriction of a service that causes the exchange of data between a source and a destination, generate an evaluation of one or more instructions by parsing a call tree of a set of service calls to identify data movement based at least in part on one or more variable names associated with the data of the computer system, to determine whether the computer system causes data to be sent from the source to the destination, the evaluation being performed based at least in part on the set of access privileges and one or more variable names associated with the data, and the evaluation including information, based at least in part on whether the access privileges are violated, indicating a flow of data among the source, the destination, and the computing system; and
perform one or more operations based at least in part on the evaluation to determine whether the data exchanged between the source and destination was performed correctly.

6. The system of claim 5, wherein:
generating the evaluation of the one or more instructions based at least in part on the set of access privileges further includes utilizing the access privileges to limit a scope of instruction evaluation to the one or more instructions; and
the set of access privileges specifying that the computing system is permitted to access the source and the destination.

7. The system of claim 5, wherein:
the set of service calls are made by the computing system; and
the set of service calls cause the data to be retrieved from the source or be provided for storage in the destination.

8. The system of claim 5, wherein generating an evaluation of the one or more instructions further includes evaluating possible flows of the call tree to identify whether the one or more instructions cause the data to be sent from the source to the destination.

9. The system of claim 5, wherein the instructions that, as a result of being executed by the one or more processors of the system, further cause the system to perform one or more corrective actions based at least in part on the evaluation.

10. The system of claim 9, wherein:
the instructions that, as a result of being executed by the one or more processors of the system, further cause the system to determine whether the data is categorized as sensitive or secretive;
in response to determining that the data is categorized as sensitive or secretive, the one or more corrective actions comprise deleting the data from the destination; and
the destination is a data store.

11. The system of claim 5, wherein:
the instructions that, as a result of being executed by the one or more processors of the system, further cause the system to determine an identity associated with the data based at least in part on references made to the data; and
wherein the one or more variable names further include method names given to the data.

12. The system of claim 5, wherein:
the source is a member of a set of sources and the destination is a member of a set of destinations; and the set of sources and the set of destinations are identified prior to generating an evaluation of one or more instructions.

13. A non-transitory computer-readable storage medium having stored thereon executable instructions that, as a result of being executed by one or more processors of a computer system, cause the computer system to at least:
   identify a destination for a data portion to generate an identification, generating the identification including obtaining an access control policy that specifies enforcement of an access restriction of a service that causes the exchange of data between a source and a destination and evaluating computer system code by parsing a service call to a service indicating movement of the data portion, based at least in part on one or more data variable identifiers and the access control policy to determine whether the access control policy is violated, the computer system code retrieving the data portion from the source and providing the data portion to the destination for use;
   generate a mapping indicating transmission of the data portion from the source to the destination based at least in part on the identification and the evaluation; and
   use the mapping to determine whether the data portion is provided correctly.

14. The non-transitory computer-readable storage medium of claim 13, wherein the instructions further comprise instructions that, as a result of being executed by the one or more processors, cause the computer system to delete the data portion from the destination or send, to a device associated with an administrator, a notification that the data portion is stored in the destination.

15. The non-transitory computer-readable storage medium of claim 13, wherein:
   the instructions further comprise instructions that, as a result of being executed by the one or more processors, cause the computer system to receive one or more method names associated with the one or more data variable identifiers; and
   the instructions that cause the computer system to evaluate the computer system code further include instructions that cause the computer system to evaluate the computer system code based at least in part on the one or more method names.

16. The non-transitory computer-readable storage medium of claim 13, wherein the instructions that cause the computer system to evaluate the computer system code based at least in part on the one or more data variable identifiers further include instructions that cause the computer system to:
   identify references to the one or more data variable identifiers in the computer system code; and
   simulate, in a simulation environment, execution of the computer system code to determine whether the computer system code causes the data portion to be sent, via the service, from the source to the destination.

17. The non-transitory computer-readable storage medium of claim 13, wherein the instructions further comprise instructions that, as a result of being executed by the one or more processors, cause the computer system to:
   prior to evaluating the computer system code, determine whether an access restriction permits the service to cause the data portion to be retrieved from the source and provided to the destination; and
   initiate evaluating the computer system code on a condition that the access restriction permits the service to cause the data portion to be retrieved from the source and provided to the destination.

18. The non-transitory computer-readable storage medium of claim 17, wherein the computer system code is retained by an instruction repository and provided to the service for execution.

19. The non-transitory computer-readable storage medium of claim 13, wherein:
   the computer system code specifies one or more application programming interface (API) service calls made by the service; and
   at least one API service call of the one or more API service calls enables the service to retrieve the data portion from the source and provide the data portion to the destination.

20. The non-transitory computer-readable storage medium of claim 13, wherein:
   the service, the source, and the destination are subject to a system-wide access control policy; and
   the access control policy specifies enforcement of an access restriction of the service.

* * * * *